(12) United States Patent
Kamdar et al.

(10) Patent No.: US 7,245,905 B2
(45) Date of Patent: Jul. 17, 2007

(54) METHOD AND SYSTEM FOR MANAGING MOBILE HANDSET PORTABILITY WITHIN TELEMATICS EQUIPPED VEHICLES

(75) Inventors: Hitan S. Kamdar, Utica, MI (US); Michael Kukulski, Southgate, MI (US); Anthony J. Sumcad, Southfield, MI (US)

(73) Assignee: General Motors Corporation, Detroit, MI (US)

( * ) Notice: Subject to any disclaimer, the term of this patent is extended or adjusted under 35 U.S.C. 154(b) by 179 days.

(21) Appl. No.: 10/716,570

(22) Filed: Nov. 17, 2003

(65) Prior Publication Data

US 2005/0107132 A1    May 19, 2005

(51) Int. Cl.
*H04M 3/00* (2006.01)

(52) U.S. Cl. .................. 455/418; 455/417; 455/445; 379/211.02; 379/88.23

(58) Field of Classification Search ............. 455/569.2, 455/569.1, 445, 517, 418, 417; 701/1, 32; 709/227, 207; 379/211.02, 88.23
See application file for complete search history.

(56) References Cited

U.S. PATENT DOCUMENTS

| | | | |
|---|---|---|---|
| 6,577,928 B2 * | 6/2003 | Obradovich | 701/1 |
| 6,711,474 B1 * | 3/2004 | Treyz et al. | 701/1 |
| 6,895,310 B1 * | 5/2005 | Kolls | 701/1 |
| 7,039,708 B1 * | 5/2006 | Knobl et al. | 709/227 |
| 2002/0068543 A1 * | 6/2002 | Shah | 455/351 |
| 2003/0224840 A1 * | 12/2003 | Frank et al. | 455/575.9 |
| 2004/0092253 A1 * | 5/2004 | Simonds et al. | 455/414.2 |
| 2004/0116140 A1 * | 6/2004 | Babbar et al. | 455/517 |
| 2004/0121783 A1 * | 6/2004 | Chua et al. | 455/456.1 |
| 2004/0185842 A1 * | 9/2004 | Spaur et al. | 455/420 |
| 2005/0090279 A9 * | 4/2005 | Witkowski et al. | 455/550.1 |

\* cited by examiner

*Primary Examiner*—Danh Le
(74) *Attorney, Agent, or Firm*—Anthony Luke Simon

(57) ABSTRACT

The present invention provides a method for managing mobile handset portability within a telematics equipped mobile vehicle. The method includes assigning a primary telematics unit identifier to a user account, assigning the primary telematics unit identifier to a mobile handset, associating the mobile handset with any one of a plurality of telematics units operating within the mobile vehicle communication system, and operating the associated telematics unit. The step of associating the mobile handset may include coupling the mobile handset to the telematics unit, communicating the assigned telematics unit identifier of the mobile handset to a service provider, and downloading user preferences from the service provider wherein the user preferences are based on the user account associated with the communicated telematics unit identifier. The step of downloading the user preferences may include determining the user preferences at the service provider and receiving the user preferences from the service provider.

24 Claims, 5 Drawing Sheets

METHOD AND SYSTEM FOR MANAGING MOBILE HANDSET PORTABILITY WITHIN TELEMATICS EQUIPPED VEHICLES

FIELD OF THE INVENTION

This invention relates generally to wireless communications with a mobile vehicle. More specifically, the invention relates to a method and system for managing mobile handset portability within telematics equipped vehicles.

BACKGROUND OF THE INVENTION

The opportunity to utilize wireless features in a mobile vehicle is ever increasing as the automobile is being transformed into a communications and entertainment platform as well as a transportation platform. Wireless features include wireless vehicle communication, networking, maintenance and diagnostic services for a mobile vehicle.

Typically, conventional wireless systems within mobile vehicles (e.g. telematics units) provide voice communication. Recently, these wireless systems have been utilized to update systems within telematics units, such as, for example radio station presets. Other systems within mobile vehicles, such as, for example a power train control may be updated as well. Information may also be collected from systems and subsystems within mobile vehicles and provided to a vehicle manufacturer for analysis, such as, for example system usage, component wear, and the like. Unfortunately, updating systems within telematics units only occurs in telematics units registered to a specific user.

The present invention advances the state of the art.

SUMMARY OF THE INVENTION

One aspect of the invention includes a method for operating a telematics unit within a mobile vehicle communication system including assigning a primary telematics unit identifier to a user account, assigning the primary telematics unit identifier to a mobile handset, associating the mobile handset with any one of a plurality of telematics units operating within the mobile vehicle communication system, and operating the associated telematics unit.

In accordance with another aspect of the invention, a computer readable medium storing a computer program includes: computer readable code for assigning a primary telematics unit identifier to a user account; computer readable code for assigning the primary telematics unit identifier to a mobile handset; computer readable code for associating the mobile handset with any one of a plurality of telematics units operating within the mobile vehicle communication system; and computer readable code for operating the associated telematics unit.

In accordance with yet another aspect of the invention, a system for operating a telematics unit within a mobile vehicle is provided. The system includes means for assigning a primary telematics unit identifier to a user account. Means for assigning the primary telematics unit identifier to a mobile handset is provided. Means for associating the mobile handset with any one of a plurality of telematics units operating within the mobile vehicle communication system and means for operating the associated telematics unit is also provided.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE DRAWINGS

Figure 1:
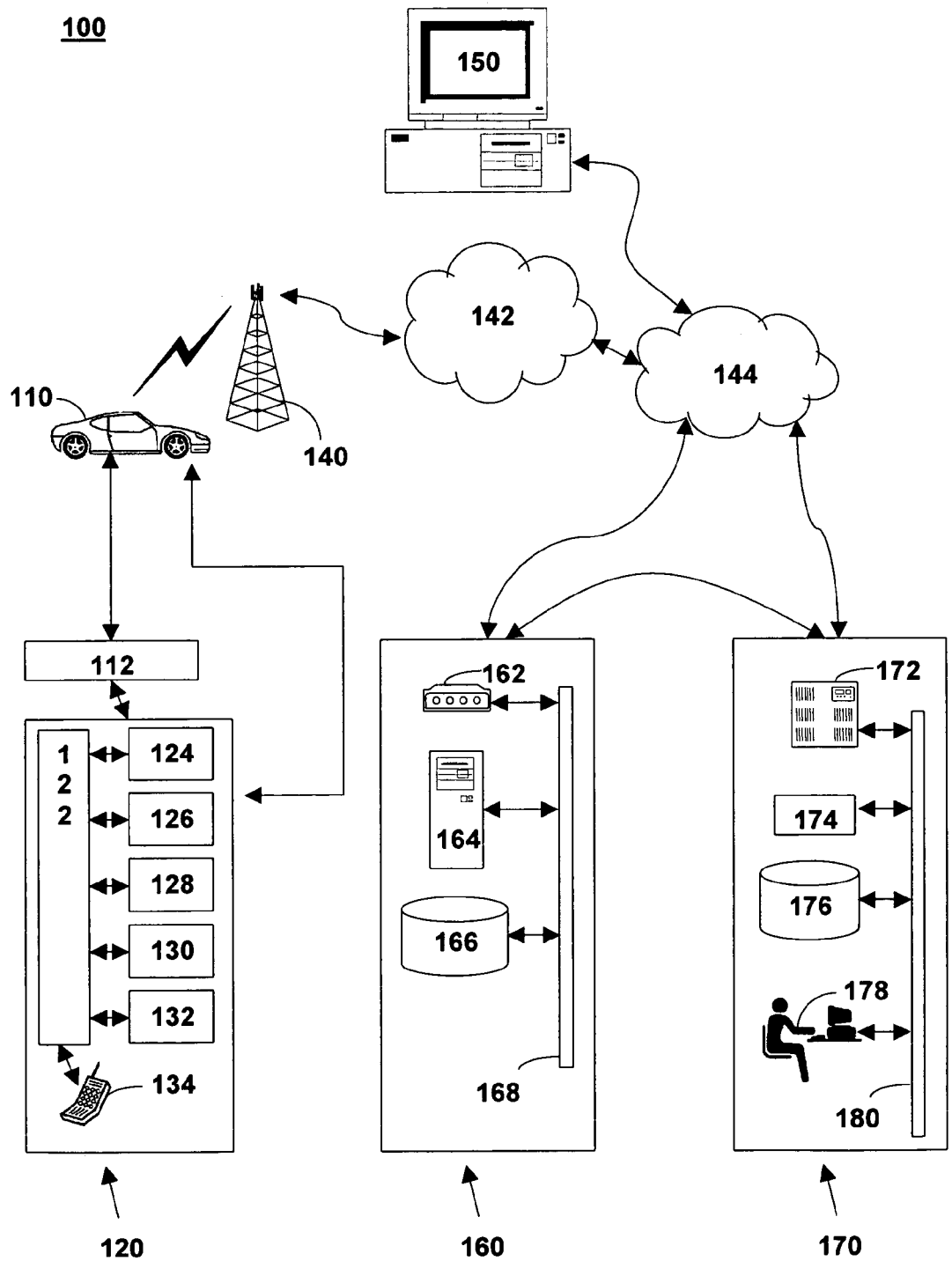
FIG. 1 illustrates an operating environment for implementing wireless communication within a mobile vehicle communication system.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components, such as, for example GPS unit 126 or speakers 132. Telematics unit 120 may include additional components not relevant to the present discussion.

In one embodiment, DSP 122 is implemented as a microcontroller, controller, host processor, or vehicle communications processor. In an example, DSP 122 is implemented as an application specific integrated circuit (ASIC). In another embodiment, DSP 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone, such as, for example an analog, digital, dual-mode, dual-band, multi-mode or multi-band cellular phone. In another embodiment, in-vehicle mobile phone 134 is implemented as a mobile handset (detailed in FIG. 2 below), such as, for example a digital handset.

DSP 122 executes various computer programs that control programming and operational modes of electronic and mechanical systems within MVCU 110. DSP 122 controls communications (e.g. call signals) between telematics unit 120, wireless carrier system 140, and call center 170. In one embodiment, a voice-recognition application is installed in DSP 122 that can translate human voice input through microphone 130 to digital signals. DSP 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers. In this embodiment, signals from DSP 122 are translated into voice messages and sent out through speaker 132.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140.

Figure 2:
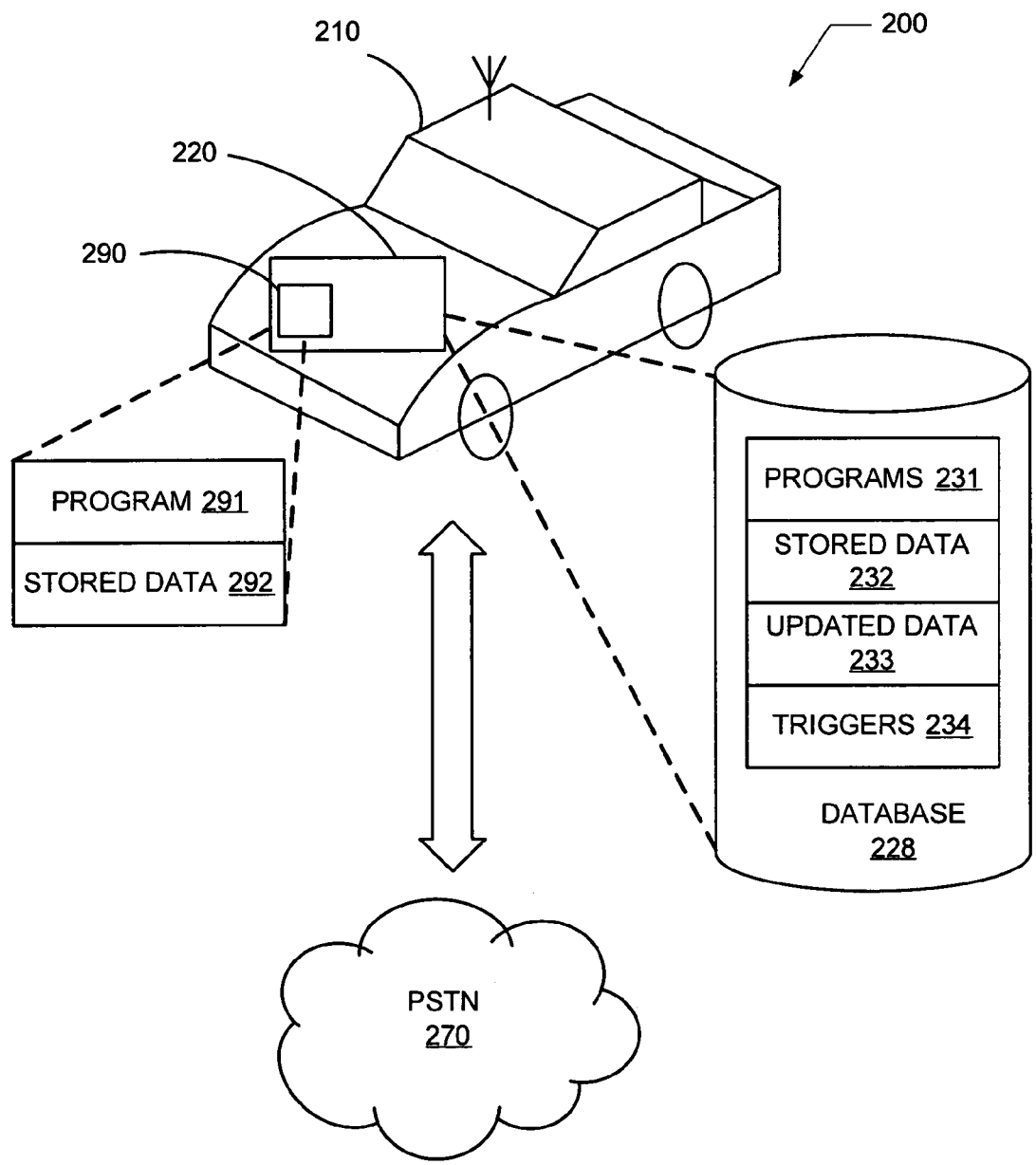
FIG. 2 is a block diagram of telematics based programming gateway in accordance with an embodiment of the present invention.

FIG. 2 is a block diagram of a telematics based programming gateway in accordance with an embodiment of the present invention. FIG. 2 shows a telematics based programming gateway system 200 for managing telematics services within a telematics equipped mobile vehicle. In FIG. 2, the programming gateway system includes a mobile vehicle 210 having a telematics unit 220 coupled to mobile handset 290, and a communication network 270, such as, for example a public switched telephone network (PSTN). Telematics unit 220 further includes a database 228 that contains programs 231, stored data 232, updated data 233 and triggers 234. Mobile handset 290 further includes a program 291 and stored data 292. In FIG. 2, the elements are presented for illustrative purposes and are not intended to be limiting. Telematics based programming gateway system 200 may include additional components not relevant to the present discussion.

As used herein, the term "coupled" means that the "coupled" elements are able to communicate. The term includes both direct wired connections, as known in the art, as well as wireless connections, such as communications using 802.11 enabled-devices and communications using Bluetooth enabled devices. Other wireless communications systems are also anticipated, and are included within the scope of this disclosure.

Telematics unit 220 is any telematics device enabled for operation with a telematics service provider, such as, for example telematics unit 120 as described with reference to FIG. 1. Telematics unit 220 in mobile vehicle 210 is in communication with communication network 270 (e.g. a "PSTN"). Telematics unit 220 includes volatile and non-volatile memory components for storing data and programs. In one embodiment, memory components in telematics unit 220 contain database 228.

Database 228 includes one or more programs 231 for operating telematics unit 220, such as, for example associating a mobile handset with telematics unit 220 within a mobile vehicle 210. In an example, program module 231 receives a signal that mobile handset 290 is coupled to the telematics unit at updated data 233. In this example, the signal that the mobile handset 290 is coupled to the telematics unit 220 is cached within updated data 233. The program to associate mobile handset 290 with telematics unit 220 is stored at stored data 232 for use by programs 231. Stored data 232 additionally includes a telematics unit identifier, such as, for example mobile identification number as is known in the art.

Mobile handset 290 is any mobile handset having software and hardware components that allow functioning of a telematics unit within a mobile vehicle, such as, for example in-vehicle mobile phone 134 as described with reference to FIG. 1. In another example, mobile handset 290 is implemented as a digital handset as is known in the art. In one embodiment, mobile handset 290 is interfaced directly to telematics unit 220. In another embodiment, mobile handset 290 is coupled to telematics unit 220, such as, for example by a cable. Mobile handset 290 includes a telematics unit identifier that identifies mobile handset 290 to telematics unit 220 and communication network 270.

Mobile handset 290 contains one or more processors, one or more memory devices and one or more connection ports. In one embodiment, mobile handset 290 includes a software switch for scanning received information, such as, for example a signal that mobile handset 290 is coupled to telematics unit 220. Mobile handset 290 includes one or more programs 291 and stored data 292 stored in memory. In one embodiment, program 291 includes software for receiving a signal that mobile handset 290 is coupled to telematics unit 220 and storing the received signal at stored data 292.

In operation, associating mobile handset 290 with telematics unit 220 within a mobile vehicle 210 includes determining that mobile handset 290 is coupled to telematics unit 220, communicating the telematics unit identifier of the mobile handset to communication network 270, such as, for example a service provider, and downloading user preferences from the service provider. In one embodiment, associating mobile handset 290 with telematics unit 220 within a mobile vehicle 210 further includes implementing the downloaded user preferences. In another embodiment, downloading user preferences from the service provider includes determining the user preferences at the service provider and receiving the user preferences from the service provider.

In yet another embodiment, the user preferences are based on a user account associated with the communicated telematics unit identifier. In another embodiment, the user preferences are based on a user account associated with the communicated telematics unit identifier and a mobile vehicle type, such as, for example vehicle make, model, year, and the like. Examples of user preferences include seat position preference, a mirror position preference, a door lock behavior preference, a radio station preset selection preference, a climate setting preference, a button configuration preference, and a theft alarm setting preference, as well as other preferences and user options in an ever-increasing list of telematics and vehicle services.

The present invention allows the mobile handset to associate with any one of a plurality of telematics equipped mobile vehicles (e.g. a user's primary vehicle, a user's secondary vehicle, a compatible rental vehicle) and provide relevant user preferences to the telematics unit for implementation within the mobile vehicle as well as subscribed telematic services.

Figure 3:
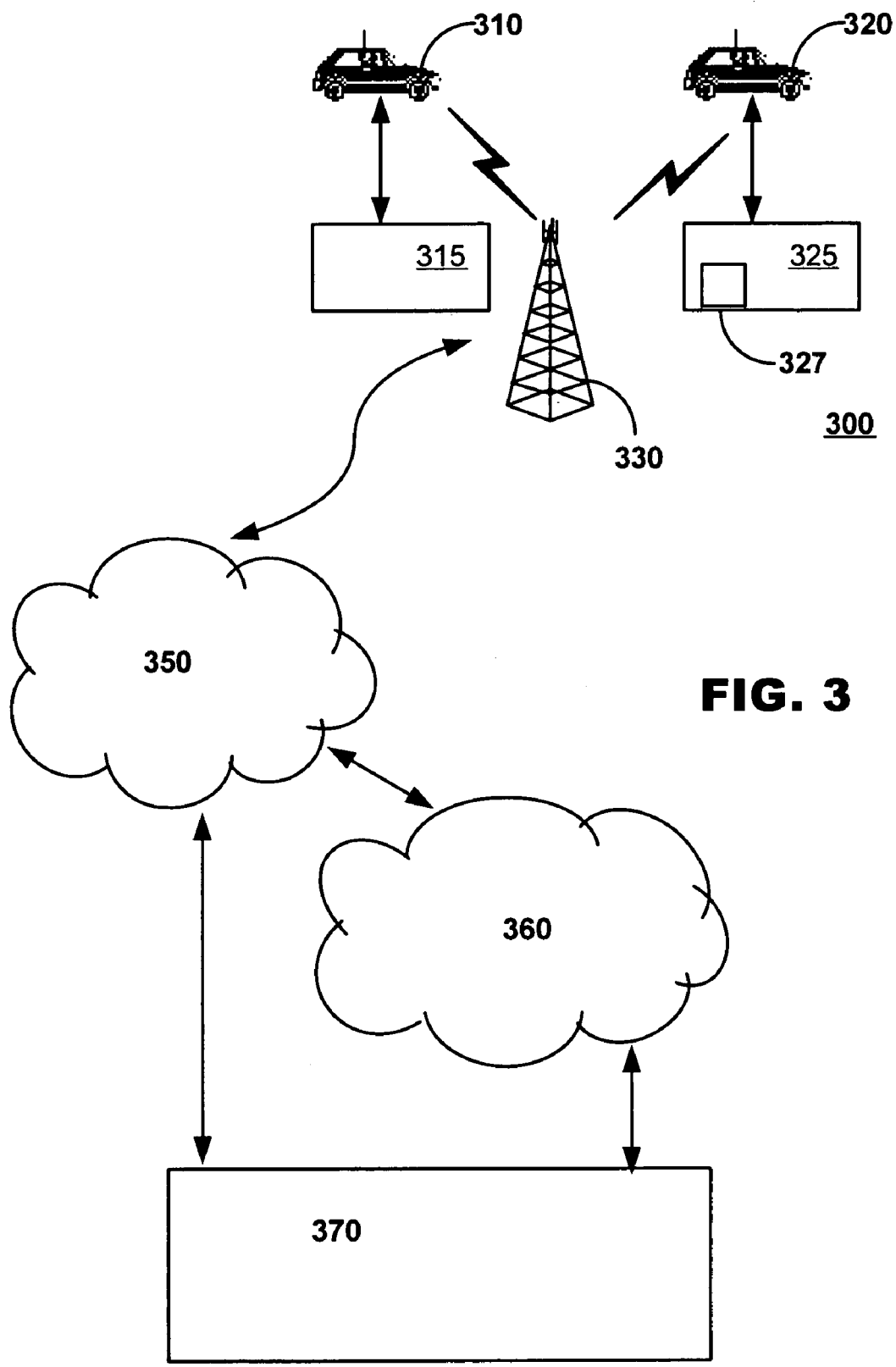
FIG. 3 illustrates another operating environment for implementing wireless communication within a mobile vehicle communication system.

FIG. 3 illustrates another embodiment of system for data transmission over a wireless communication system, in accordance with the present invention at 300. Mobile vehicle communication system (MVCS) 300 includes a mobile vehicle communication units (MVCUs) 310 and 320, associated telematics units 315 and 325, one or more wireless carrier systems 330, one or more communication networks 350, one or more land networks 360, and one or more call centers 370. Telematics unit 325 additionally includes mobile handset 327. In one embodiment, MVCUs 310 and 320 are implemented as mobile vehicles equipped with suitable hardware and software for transmitting and receiving voice and data communications. MVCS 300 may include additional components not relevant to the present discussion. Mobile vehicle communication systems and telematics units are known in the art.

MVCU 320, via telematics unit 325 and mobile handset 327, sends to and receives radio transmissions from wireless carrier system 330. Wireless carrier system 330 is implemented as any suitable system for transmitting a signal from MVCU 320 to communication network 350. Land network 360 connects communication network 350 to call center 370. In one embodiment, land network 360 is a public-switched telephone network (PSTN). In another embodiment, land network 360 is implemented as an Internet protocol (IP) network.

In an example and referring to FIG. 1 above, MVCU 320 is implemented as MVCU 110 including in-vehicle mobile phone 134 implemented as a mobile handset coupled to telematics unit 120, MVCU 310 is implemented as a mobile vehicle similar to MVCU 110 but not including in-vehicle mobile phone 134 implemented as a mobile handset coupled to telematics unit 120, wireless carrier system 330 is implemented as wireless carrier system 140, communication network 350 is implemented as communication network 142, land network 360 is implemented as land network 144, and call center 370 is implemented as call center 170. In another example, mobile handset 327 is implemented as mobile handset 290 as described with reference to FIG. 2.

In operation, a user determines one of a plurality of compatible vehicles to associate with a mobile handset. In one embodiment, MVCU 310 is a primary vehicle (e.g. the user's primary vehicle) as determined by MVCU 310 having the same telematics unit identifier (TUI) as mobile handset 327. In this embodiment, MVCU 320 is a secondary vehicle as determined by MVCU 320 not having the same telematics unit identifier (TUI) as mobile handset 327. Examples of a secondary vehicle include a user's secondary vehicle, a rental vehicle, and the like.

The mobile handset is coupled to the telematics unit within the mobile vehicle. In one embodiment, mobile handset 327 is coupled to telematics unit 325. A determination is made as to whether the telematics unit the mobile handset is coupled to is the primary vehicle or any secondary vehicle, such as, for example by comparing the telematics unit identifier (TUI) of the mobile handset to the telematics unit identifier (TUI) of the telematics unit within the mobile vehicle. In one embodiment, the determination determines mobile handset 327 is coupled to telematics unit 325 within secondary MVCU 320. Calls are then routed to the telematics unit to which the mobile handset is coupled. In an example, calls are then routed to telematics unit 325 to which mobile handset 327 is coupled In one embodiment, calls are sent to the telematics unit within the secondary mobile vehicle (called a "secondary telematics unit") when the mobile handset is coupled to the secondary telematics unit. In an example, calls are sent to secondary telematics unit 325 when mobile handset 327 is coupled to secondary telematics unit 325. A determination is made as to whether the call is answered at the secondary telematics unit. If the call is not answered, the call is forwarded to the telematics unit within the primary mobile vehicle (call a "primary telematics unit"). In an example, if the call is not answered at secondary telematics unit 325, the call is forwarded to primary telematics unit 315. A determination is then made as to whether the call is answered at the primary telematics unit. If the call is not answered, the call is forwarded to voice mail. In one example, if the call is not answered at primary telematics unit 315, the call is forwarded to voice mail.

Figure 4:
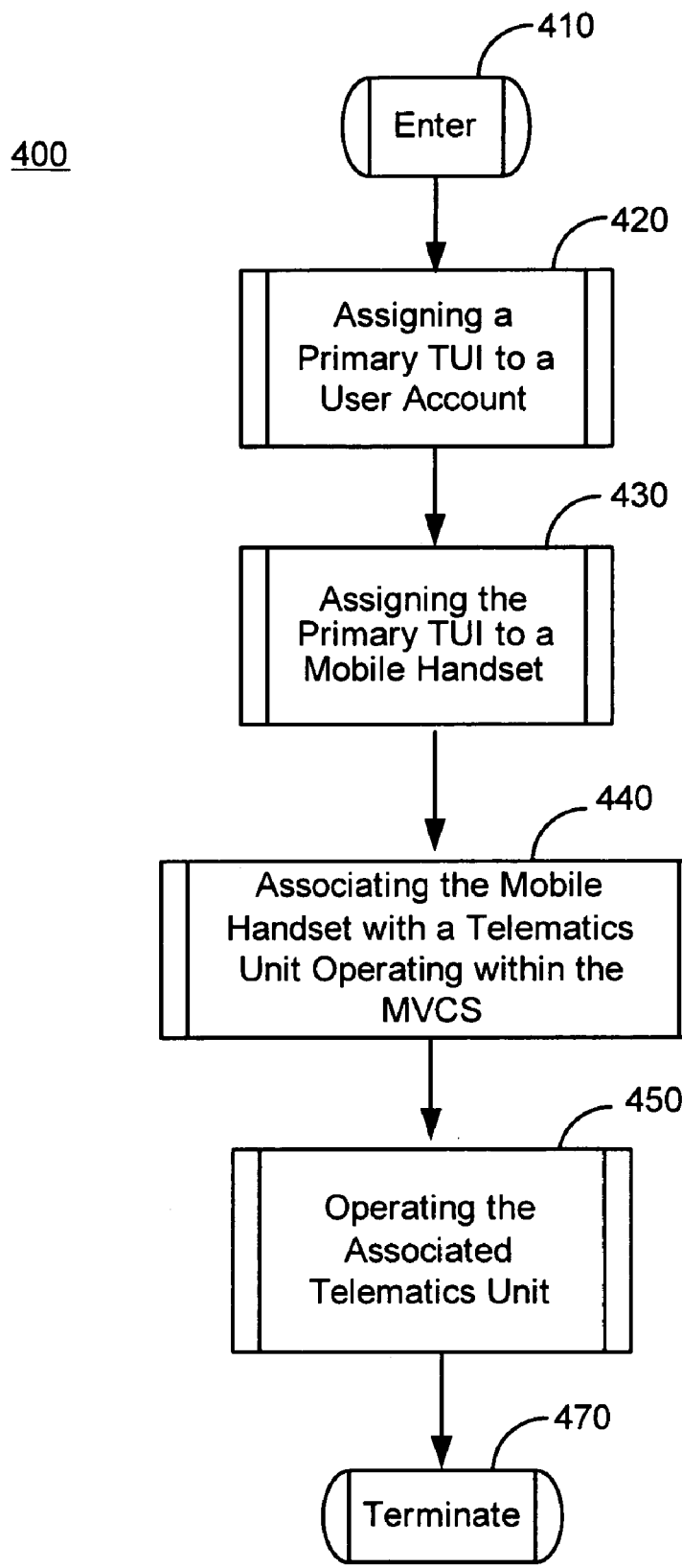
FIG. 4 is a flow diagram of one embodiment of a method of managing mobile handset portability within a telematics equipped mobile vehicle, in accordance with the present invention.

FIG. 4 is a flow diagram of an embodiment of a method of managing mobile handset portability within a telematics equipped mobile vehicle. In FIG. 4, method 400 may utilize one or more systems detailed in FIGS. 1-3, above. The present invention can also take the form of a computer usable medium including a program for configuring an electronic module within a vehicle. The program stored in the computer usable medium includes computer program code for executing the method steps described in FIG. 4. In FIG. 4, method 400 begins at step 410.

At step 420, a primary telematics unit identifier (TUI) is assigned to a user account. In one embodiment, the user account is a subscription service. In another embodiment, the telematics unit identifier (TUI) is a mobile identification number. At step 430, the primary telematics unit identifier (TUI) is assigned to a mobile handset. In one embodiment, the mobile handset is a digital handset.

At step 440, the mobile handset is associated with a telematics unit operating within a mobile vehicle communication system. In one embodiment, the mobile handset is associated with any one of a plurality of telematics units operating within the mobile vehicle communication system. In another embodiment, associating the mobile handset with any one of a plurality of telematics units operating within the mobile vehicle communication system includes coupling the mobile handset to the telematics unit, communicating the assigned telematics unit identifier of the mobile handset to a service provider, and downloading user preferences from the service provider, the user preferences based on the user account associated with the communicated telematics unit identifier. In yet another embodiment, associating the mobile handset with any one of a plurality of telematics units operating within the mobile vehicle communication system additionally includes implementing the downloaded user preferences. In another embodiment, the user preferences are based on a mobile vehicle type. In still another embodiment, downloading user preferences based on the user account includes determining the user preferences at the service provider, and receiving the user preferences from the service provider.

Examples of user preferences include a mirror position preference, a door lock behavior preference, a radio station preset selection preference, a climate setting preference, a button configuration preference, and a theft alarm setting preference.

In another embodiment, associating the mobile handset with any one of a plurality of telematics units operating within the mobile vehicle communication system includes coupling the mobile handset to the telematics unit, determining if the telematics unit coupled to the mobile handset is a primary telematics unit, determining if the telematics unit coupled to the mobile handset is a secondary telematics unit, and routing calls (detailed in FIG. 5, below) to the determined telematics unit. In this embodiment, the primary telematics unit includes the primary telematics unit identifier and the secondary telematics does not include the primary telematics unit identifier.

At step 450, the associated telematics unit is operated. At step 470, the method is terminated.

Figure 5:
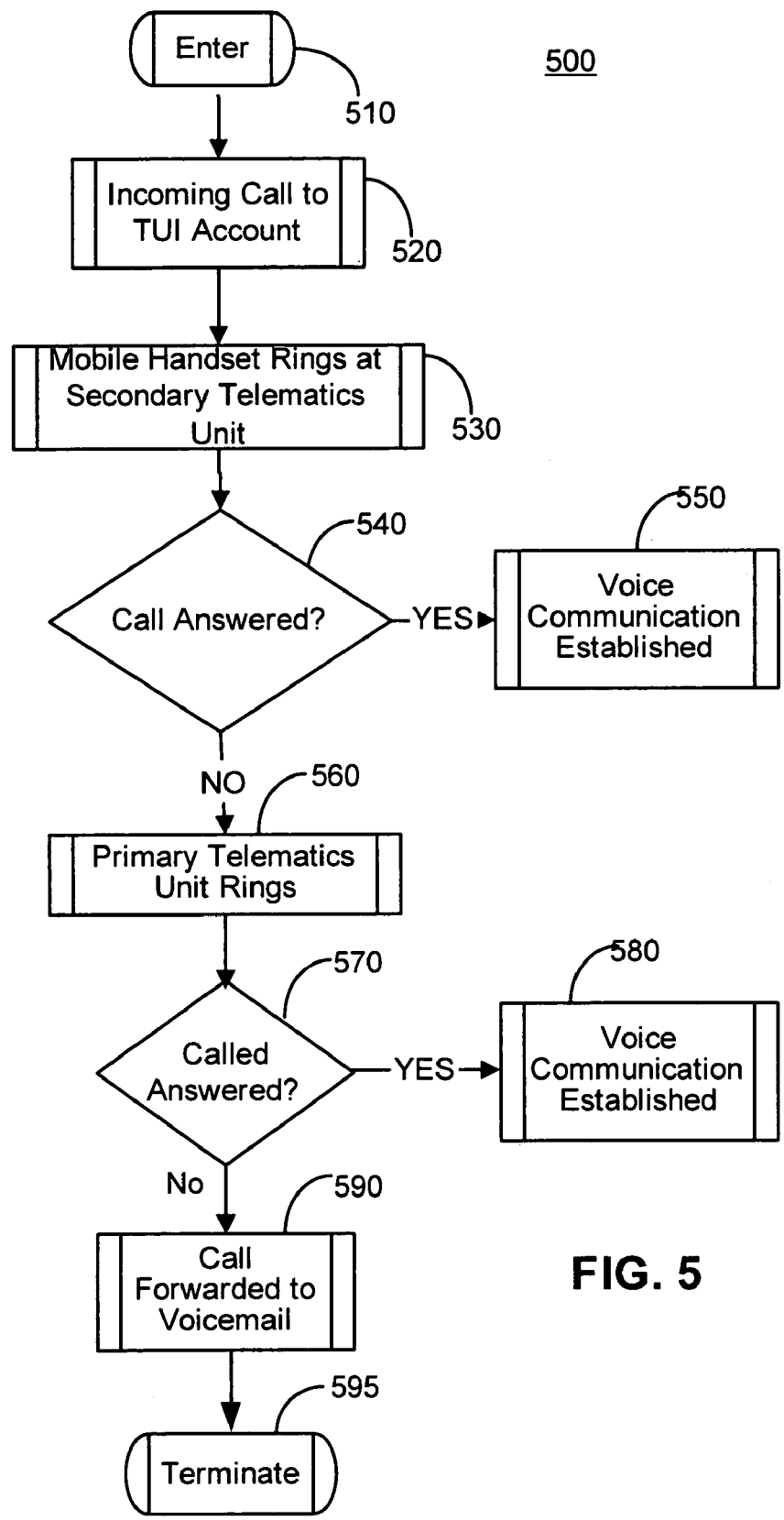
FIG. 5 is a flow diagram of an embodiment of routing calls to a telematics unit within a mobile vehicle communication system, in accordance with the present invention.

FIG. 5 is a flow diagram of an embodiment of a method of routing calls to a telematics unit within a mobile vehicle communication system. In FIG. 5, method 500 may utilize one or more systems detailed in FIGS. 1-3, above. The present invention can also take the form of a computer usable medium including a program for configuring an electronic module within a vehicle. The program stored in the computer usable medium includes computer program code for executing the method steps described in FIG. 5. In FIG. 5, method 500 begins at step 510.

At step 520, an incoming call to a telematics user identifier (TUI) account is received. At step 530, a mobile handset coupled to a secondary telematics unit rings. In one embodiment, the call is sent to the secondary telematics unit when the mobile handset is coupled to the secondary telematics unit. In an example and referring to FIG. 3, the call is sent to secondary telematics unit 325 when mobile handset 327 is coupled to secondary telematics unit 325.

At step 530, the mobile handset coupled to the secondary telematics unit rings. At decision step 540, a determination is made as to whether the call is answered at the secondary telematics unit. If the call is answered at the secondary telematics unit, method 500 advances to step 550. If the call is not answered at the secondary telematics unit, method 500 advances to step 560. In one embodiment, the call is forwarded to a primary telematics unit when the call is not answered.

At step 550, the call is answered. In one embodiment, when the call is answered, voice communication is established. At step 560, the primary telematics unit rings.

At decision step 570, a determining is made as to whether the call is answered at the primary telematics unit. If the call is answered at the primary telematics unit, method 500 advances to step 580. If the call is not answered at the primary telematics unit, method 500 advances to step 590. In one embodiment, the call is forwarded to an answering system.

At step 580, the call is answered. In one embodiment, when the call is answered, voice communication is established. At step 590, the call is forwarded to an answering system, such as, for example voicemail. At step 595, the method is terminated.

The above-described methods and implementation for managing mobile handset portability within a telematics equipped mobile vehicle are example methods and implementations. These methods and implementations illustrate one possible approach for managing mobile handset portability within a telematics equipped mobile vehicle. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method for operating a telematics unit within a mobile vehicle communication system, the method comprising:

assigning a primary telematics unit identifier to a user account;

assigning the primary telematics unit identifier to a mobile handset;

associating the mobile handset with any one of a plurality of telematics units operating within the mobile vehicle communication system; and operating the associated telematics unit;

wherein the step of associating the mobile handset with any one of a plurality of telematics units operating within the mobile vehicle communication system comprises:

coupling the mobile handset to the telematics unit;

determining if the telematics unit coupled to the mobile handset is a primary telematics unit, the primary telematics unit including the primary telematics unit identifier;

determining if the telematics unit coupled to the mobile handset is a secondary telematics unit, the secondary telematics unit not including the primary telematics unit identifier; and routing calls to the determined telematics unit.

2. The method of claim 1, wherein the step of routing calls to the determined telematics unit comprises:
sending the call to the secondary telematics unit when the mobile handset is coupled to the secondary telematics unit;
determining if the call is answered at the secondary telematics unit; and
forwarding the call to the primary telematics unit when the call is not answered.

3. The method of claim 2, further comprising:
determining if the call is answered at the primary telematics unit; and
forwarding the call to voice mail when the call is not answered.

4. A computer readable medium for operating a telematics unit within a mobile vehicle, comprising:
computer readable code for assigning a primary telematics unit identifier to a user account;
computer readable code for assigning the primary telematics unit identifier to a mobile handset;
computer readable code for associating the mobile handset with any one of a plurality of telematics units operating within the mobile vehicle communication system; and
computer readable code for operating the associated telematics unit
wherein the computer readable code for associating the mobile handset with any one of a plurality of telematics units operating within the mobile vehicle communication system comprises:
computer readable code for determining that the mobile handset is coupled to the telematics unit;
computer readable code for determining if the telematics unit coupled to the mobile handset is a primary telematics unit, the primary telematics unit including the primary telematics unit identifier;
computer readable code for determining if the telematics unit coupled to the mobile handset is a secondary telematics unit, the secondary telematics unit not including the primary telematics unit identifier; and
computer readable code for routing calls to the determined telematics unit.

5. The computer readable medium of claim 4, wherein the computer readable code for routing calls to the determined telematics unit comprises:
computer readable code for sending the call to the secondary telematics unit when the mobile handset is coupled to the secondary telematics unit;
computer readable code for determining if the call is answered at the secondary telematics unit; and
computer readable code for forwarding the call to the primary telematics unit when the call is not answered.

6. The computer readable medium of claim 5, further comprising:
computer readable code for determining if the call is answered at the primary telematics unit; and
computer readable code for forwarding the call to voice mail when the call is not answered.

7. A method for operating a telematics unit on a vehicle and within a mobile vehicle communication system, the method comprising:
associating a primary telematics unit identifier with a user account;
associating the primary telematics unit identifier with a mobile handset;
associating the mobile handset with a selected telematics unit operating within the mobile vehicle communication system;
determining if the selected telematics unit is a primary telematics unit or a secondary telematics unit, wherein the primary telematics unit includes the primary telematics unit identifier and the secondary telematics unit does not include the primary telematics unit identifier; and
operating the selected telematics unit.

8. The method of claim 7, wherein the step of operating the selected telematics unit comprises routing calls to the selected telematics unit.

9. The method of claim 8, wherein routing calls to the selected telematics unit further comprises establishing voice communication if the call is answered.

10. The method of claim 8, wherein routing calls to the selected telematics unit comprises:
sending a call to the mobile handset;
determining if the call is answered at the mobile handset; and
forwarding the call to the selected telematics unit if the call is not answered at the mobile handset.

11. The method of claim 10, wherein routing calls to the selected telematics unit further comprises:
determining if the call is answered at the selected telematics unit; and
forwarding the call to an answering system if the call is not answered at the selected telematics unit.

12. The method of claim 8, wherein routing calls to the selected telematics unit comprises:
sending a call to the secondary telematics unit when the mobile handset is associated with the secondary telematics unit;
determining if the call is answered at the secondary telematics unit; and
forwarding the call to the primary telematics unit if the call is not answered at the secondary telematics unit.

13. The method of claim 7, further comprising the step of communicating the telematics unit identifier to a service provider.

14. The method of claim 7, further comprising the step of downloading user preferences from a service provider using the selected telematics unit.

15. The method of claim 14, wherein the user preferences are based on the user account associated with the primary telematics unit identifier.

16. The method of claim 14, wherein the user preferences are based on a mobile vehicle type.

17. The method of claim 7, wherein the primary telematics unit identifier is a mobile identification number.

18. A method for operating a telematics unit on a vehicle and within a mobile vehicle communication system, the method comprising:
associating a telematics unit identifier with a user account;
associating the telematics unit identifier with a mobile handset;
associating the mobile handset with a selected telematics unit operating within the mobile vehicle communication system;
routing calls to the mobile handset;
determining if the call is answered at the mobile handset; and
forwarding the call to the selected telematics unit if the call is not answered at the mobile handset.

19. The method of claim 18, wherein the step of routing calls to the selected telematics unit further comprises establishing voice communication if the call is answered.

20. The method of claim 18, wherein the step of routing calls to the selected telematics unit further comprises:
   determining if the call is answered at the selected telematics unit; and
   forwarding the call to an answering system if the call is not answered at the selected telematics unit.

21. The method of claim 18, further comprising the step of downloading user preferences from a service provider to the selected telematics unit.

22. The method of claim 21, wherein the user preferences are based on the user account associated with the telematics unit identifier.

23. The method of claim 18, further comprising the step of communicating the assigned telematics unit identifier of the mobile handset to a service provider.

24. A method for operating a telematics unit on a vehicle and within a mobile vehicle communication system, the method comprising:
   associating a telematics unit identifier with a user account;
   associating the telematics unit identifier with a mobile handset;
   associating the mobile handset with a telematics unit operating within the mobile vehicle communication system;
   sending an incoming call for the telematics unit identifier to the mobile handset;
   forwarding the call to the selected telematics unit if the call is not answered at the mobile handset; and
   forwarding the call to an answering system if the call is not answered at the selected telematics unit.

* * * * *